(12) United States Patent
Itoh et al.

(10) Patent No.: US 7,108,904 B2
(45) Date of Patent: *Sep. 19, 2006

(54) MOLD-IN FASTENING MEMBER AND PROCESS FOR PRODUCING MOLDED RESIN ARTICLE HAVING THE SAME

(75) Inventors: Hiroshi Itoh, Osaka (JP); Kunihiko Shimamura, Sakai (JP); Tooru Tanokura, Osaka (JP); Shiro Ogawa, Osaka (JP); Takashi Saeki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 414 days.

This patent is subject to a terminal disclaimer.

(21) Appl. No.: 10/395,200

(22) Filed: Mar. 25, 2003

(65) Prior Publication Data

US 2003/0219586 A1 Nov. 27, 2003

(30) Foreign Application Priority Data

Mar. 26, 2002 (JP) ............................. 2002-086126
May 10, 2002 (JP) ............................. 2002-135054

(51) Int. Cl.
*B32B 3/06* (2006.01)
(52) U.S. Cl. .................... 428/99; 428/100; 24/442; 264/274; 264/275
(58) Field of Classification Search .............. 428/99, 428/100, 137; 24/442; 264/274, 275
See application file for complete search history.

(56) References Cited

U.S. PATENT DOCUMENTS 4,470,857 A 9/1984 Casalou
5,110,649 A * 5/1992 Morse et al. ............... 428/100
5,922,436 A * 7/1999 Banfield et al. ............ 428/100
6,460,230 B1* 10/2002 Shimamura et al. .......... 24/452
2002/0031637 A1 3/2002 Oborny et al.
2002/0164449 A1* 11/2002 Fujisawa et al. ............. 428/99

FOREIGN PATENT DOCUMENTS

| DE | 90 13 133 | 1/1992 |
| EP | 0 439 969 | 8/1991 |
| FR | 2 423 666 | 11/1979 |
| JP | 1-113214 | 5/1989 |
| JP | 5-16173 | 1/1993 |
| JP | 7-148007 | 6/1995 |

\* cited by examiner

Primary Examiner—Alexander S. Thomas
(74) Attorney, Agent, or Firm—Oblon, Spivak, McClelland, Maier & Neustadt, P.C.

(57) ABSTRACT

The mold-in fastening member comprises a substrate having engaging elements on a top surface thereof and a foamed synthetic resin layer bonded to a rear surface of the substrate. The foamed synthetic resin layer has overhanging marginal portions or sealing portions extending outwardly beyond at least both lateral edges of the substrate. The foamed synthetic resin layer has a thickness of 1 to 10 mm and an initial compressive modulus of 0.02 to 1.0 MPa. The mold-in fastening member surely prevents a molding resin from entering through gaps between the mold-in fastening member and a recess formed in a mold.

7 Claims, 2 Drawing Sheets

MOLD-IN FASTENING MEMBER AND PROCESS FOR PRODUCING MOLDED RESIN ARTICLE HAVING THE SAME

CROSS-REFERENCE TO RELATED APPLICATIONS

This application is related to and claims priority, under 35 U.S.C. § 119, from Japanese Patent Application No. 86126/2002, filed in the Japanese Patent Office on Mar. 26, 2002, and Japanese Patent Application No. 135054/2002, filed in the Japanese Patent Office on May 10, 2002, wherein the entire contents of the aforementioned two Japanese Patent Applications are hereby incorporated by reference herein.

BACKGROUND OF THE INVENTION

1. Field of the Invention

The present invention relates to a mold-in fastening member to be fixed to the surface of a molded resin article, such as automotive seat cushions and office chair cushions. The molded resin article with the mold-in fastening member is made into seats, etc. by fixing an upholstery material, such as fabric or similar, to the surface of the molded resin article through the mold-in fastening member.

2. Discussion of Background

A new molding method has recently been proposed for the production of an automotive seat. This method involves the steps of: placing a fastening member, having a large number of engaging elements on its top surface and a large number of anchoring elements on its back surface, i.e., a flat fastener tape, in position within a mold; injecting a foamable resin into the mold; and expanding the foamable resin such that the anchoring elements are embedded into a molded resin article to integrally bind the molded resin article and the flat fastener tape and the engaging elements are bared or exposed on its outer surface (i.e., so-called mold-in forming method). The molded resin article is covered along its contour with a seat cover (i.e., upholstery material) by the engaging function between the engaging elements on the back surface of the seat cover and the engaging elements of the flat fastener tape.

In the mold-in forming method, a fastening member is held in place within a mold by fitting it into a recess formed at a given position of the mold with its surface having engaging elements facing the bottom of the recess and then, a resin is cast into the mold while keeping the fastening member in position to perform the molding. In performing the mold-in forming method with the fastening member fitted into the recess of the mold, a liquid foamable molding resin (hereinafter may be referred to as "resin") injected into the mold may enter into the side of the fastening members through gaps between the fastener member and the recess of the mold, thereby burying the engaging elements in the resin. Since the engaging elements buried in the resin no longer have the engaging function, the infiltration of the resin through the gaps between the fastener member and the recess of the mold should be prevented. More specifically, since the fastening member is usually of an elongated rectangular shape, i.e., a tape-like shape, the infiltration of the molding resin occurs at gaps between the lateral edges of the fastening member and the recess, particularly the shoulders of the recess, and gaps between the longitudinal edges of the fastening member and the edges (shoulders) of the recess. Since the infiltrated resin buries the engaging elements held in the recess, the engaging elements that are intended to be exposed to the surface of the molded resin article are no longer exposed because of the covering resin.

A conventional method for solving the above-described problems is shown in FIG. 3. A fastening member (A) comprises a flat fastener tape (E), a steel strip (F), and a cover film (G). The flat fastener tape (E) has a substrate (B) having a large number of engaging elements (C) on its top surface and a large number of anchoring elements (D) on its back surface. The steel strip (F) under the engaging elements (C) is magnetically attached to a magnet (J) embedded in the bottom of a mold during the mold-in process. The cover film (G) entirely covers the steel strip (F) and the engaging elements (C) to prevent a molding resin composition from entering into the side of the engaging elements (C) during the mold-in process. The outer periphery of the cover film (G) is integrally bonded to the periphery of the flat fastener tape (E) by an adhesive or heat sealing.

The fastening member (A) is fixed in a recess (K) of the mold by the magnetic force exerted on the steel strip (F) by the magnet (J) disposed at the bottom of the mold with the engaging elements (C) facing the bottom of the recess (K). Then, a foamable resin is injected into the mold to produce a molded article, such as a cushion, in which the anchoring elements (D) are embedded. After taking the molded article out of the mold, the cover film (G) and the steel strip (F) are removed to allow the engaging elements (C) of the flat fastener to be bared or exposed on the surface of the molded article.

However, after the production of the molded article, the above-described mold-in forming method requires the removal of the steel strip (F) and the cover film (F) which should be disposed of as waste. In addition, the cover film (G) should be removed with great care to make the removing operation troublesome because film residues on the engaging surface, if any, prevent the exposure of the engaging elements (C) to result in a reduced engaging force and poor appearance. Thus, the removing operation is labor-intensive and the removal of the steel strip (F) has a risk of injuring fingers or hands.

Japanese Patent Application Laid-Open No. 1-113214 (hereinafter "JP '214") and Japanese Patent Application Laid-Open No. 5-16173 (hereinafter "JP '173") each disclose fastening members comprising a flat fastener and a foamed resin bonded to each other. In JP '214, a flexible foam and a flat fastener having engaging elements are bonded to each other through a magnetic film, with the surface of the magnetic film that faces the flat fastener exposed around the periphery of the flat fastener. The magnetic film is magnetically attached at its exposed peripheral surface to magnets provided at shoulders of a recess in a mold, thereby preventing gaps from being formed. However, since the magnetic film is disposed between the flexible foam and the flat fastener, the entire part of the fastening member falls or is difficult to be efficiently fitted into the recess because of a weak magnetic attraction force. Further, it is difficult to provide magnets in the narrow space of the recess shoulder, making the proposed method difficult to put into practice.

In JP '173, a flat fastener and a foamed body having a width and a height relatively larger than those of the flat fastener are bonded to each other to form a fastening member, which is inserted into a hollow space surrounded by a raised wall formed in a mold. Therefore, the fastening member has a considerably large size and is difficult to handle. Also, a fastening member having a foamed body with a large contact resistance to the raised wall cannot be easily inserted in position.

Japanese Patent Applications Laid-Open No. 7-148007 (hereinafter "JP '007") discloses a mold-in fastening member having a substrate provided on its front surface with engaging elements and on its rear surface with fitting elements raised from the lateral edge portions and extending along the longitudinal direction. In JP '007, the head portion of the fitting elements projects outwardly from the lateral edges to leave no gap between the lateral edges of the fastening member and the recess of a mold.

Since the above fastening member is push-fitted into the recess, care must be paid to ensure a close contact between the fitting elements and the side wall of the recess. If loosely fitted, gaps are left to allow the resin to flow into the recess. Further, the proposed method is applicable only to the production of fastening members having linear shapes, but substantially inapplicable to the production of fastening members having curved shapes.

SUMMARY OF THE INVENTION

The present invention has been accomplished to solve the above-described problems of the prior art. An object of the present invention is to provide a mold-in fastening member which effectively and easily prevents a molding resin from entering through gaps between its ends and a recess formed in a mold, and can be formed into various shapes. Another object of the present invention is to provide a process for producing a molded resin article having the fastening member.

Namely, the present invention provides a mold-in fastening member comprising a substrate having engaging elements on a top surface thereof and a foamed synthetic resin layer of a synthetic resin bonded to a rear surface of the substrate, the foamed synthetic resin layer having a overhanging marginal portion (i.e., sealing portion) extending outwardly beyond at least both lateral edges of the substrate, and having a thickness of 1 to 10 mm and an initial compressive modulus of 0.02 to 1.0 MPa.

BRIEF DESCRIPTION OF THE DRAWING FIGURES

DETAILED DESCRIPTION OF THE PREFERRED EMBODIMENTS

The fastening member of the present invention is made of a thermoplastic resin such as polyolefin resins, polyester resins, and polyamide resins, with polyolefin resins being preferred in view of their good moldability. Further, to render the fastening member flexible, a thermoplastic resin having an excellent flexibility, such as a polypropylene resin, is preferably used.

Figure 1:
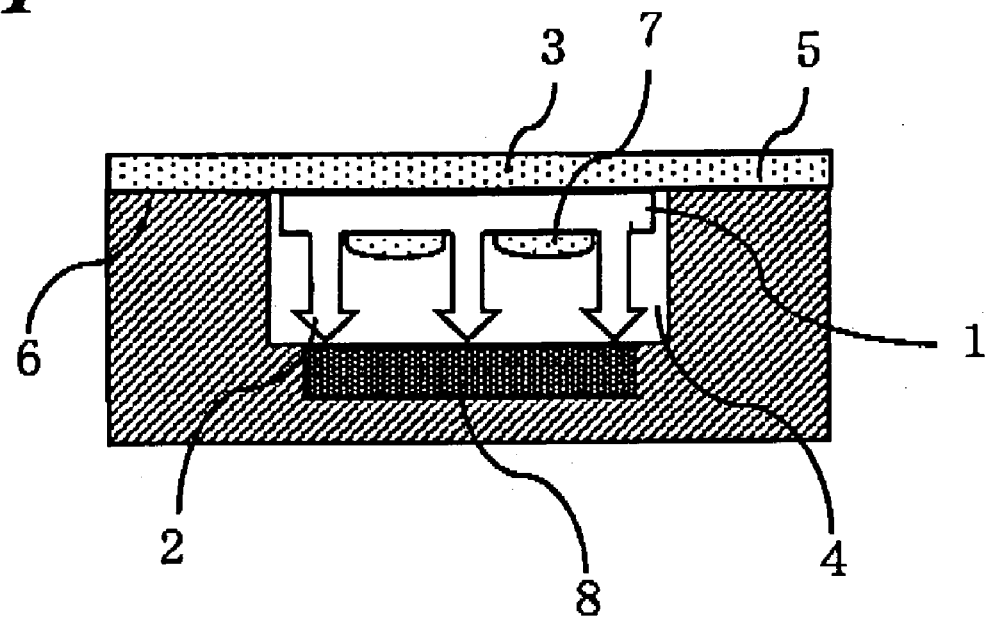
FIG. 1 is a schematic cross-sectional view showing an example of a mold-in fastening member according to the present invention.

An example of the mold-in fastening member according to the present invention is shown in FIG. 1.

The fastening member is of, for example, an elongated rectangular shape, i.e., a tape-like shape, and has a substrate 1 having a large number of engaging elements 2 integrally provided on its surface. The engaging elements 2 may be of any suitable shape, such as a mushroom shape, an arrowhead shape, and a hook shape. Although the width and length of the fastening member is not particularly restricted, the width is preferably 4 to 50 mm, more preferably 5 to 40 mm, and still more preferably 8 to 20 mm, and the length is preferably 10 to 200 cm, and more preferably 15 to 70 cm. The thickness of the substrate 1 is usually 0.2 to 1.0 mm, and preferably 0.3 to 0.7 mm. The height of the engaging elements 2 is, but not limited to, preferably 1 to 10 mm, and more preferably 1.5 to 6 mm.

The engaging elements 2 are arranged in a single row or a plurality of rows depending upon the width of the substrate 1. The density of the engaging elements 2 on the substrate 1 is preferably 30 to 100 elements/cm$^2$. The rear surface of the substrate 1 is preferred to be substantially flat because a foamed synthetic resin layer 3 is bonded thereto. The rear surface of the substrate 1 may be roughened to enhance the adhesion between the substrate 1 and the foamed synthetic resin layer 3.

The fastening member of the present invention may be produced by melt-extruding the above-mentioned thermoplastic resin through a nozzle with a slit having a predetermined shape and size to form a tape having on its surface continuous ridges in rows extending in the longitudinal direction, making cuts in each continuous ridge at small intervals, and then stretching the tape in the longitudinal direction to form a number of engaging elements on the surface of the tape.

Figure 2:
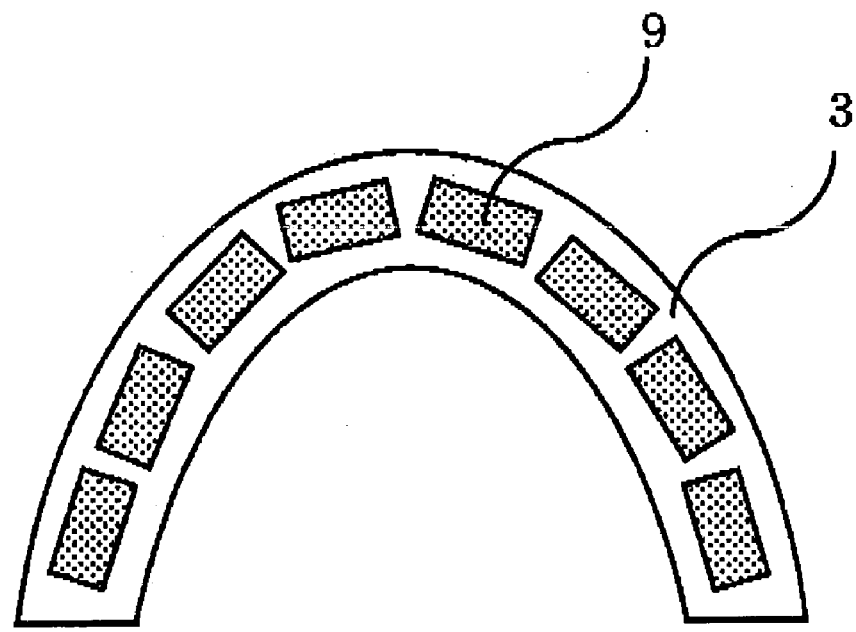
FIG. 2 is a schematic plan view showing another example of a mold-in fastening member according to the present invention.
Figure 3:
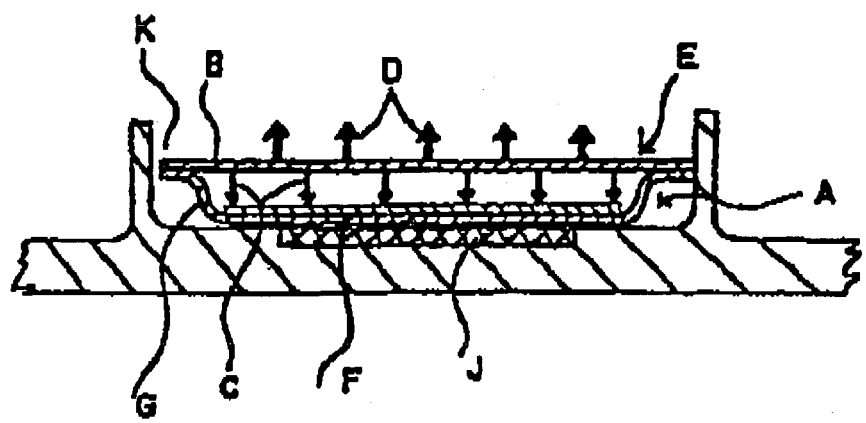
FIG. 3 is a cross-sectional view showing a conventional fastening member fitted into a recess formed in a mold.

Another example of the mold-in fastening member according to the present invention is shown in FIG. 2.

FIG. 2 is a plan view of a curved mold-in fastening member in which a plurality of unit fastening members 9, each having a rectangular shape, are bonded to a curved foamed synthetic resin layer 3 so as to form a curved series of unit fastening members 9 arranged at spaced intervals. The unit fastening members 9 shown in FIG. 2 are the same in structure as that of the fastening member shown in FIG. 1, except for having a shorter length which is preferably 0.3 to 10 cm, and more preferably 1 to 5 cm. In the present invention, a plurality of the unit fastening members 9 having different lengths may be used in combination.

The foamed synthetic resin layer 3 shown in FIG. 2 is made into a curved shape having a long enough length to arrange a predetermined number of the unit fastening members 9 thereon. Although determined according to its applications, the foamed synthetic resin layer 3 preferably has a length of 5 to 100 cm and a radius of curvature of 100 to 1,000 mm. The curved shape referred to herein includes not only the parabolic curve shown in FIG. 2, but also other nonlinear shapes required for designs.

The relative position between the lateral and longitudinal edges of the unit fastening members 9 and those of the foamed synthetic resin layer 3 is the same as that of the fastening member shown in FIG. 1. The interval between the adjacent unit fastening members 9 depends mainly on the radius of curvature. When the radius of curvature is large, namely, gently curved, the interval may be small. When the radius of curvature is small, namely, curved sharply, the interval is preferably increased. The interval is preferably 0 to 10 mm.

The curved foamed synthetic resin layer may be difficult to handle because the fastening member is readily deformed. To solve this problem, the foamed synthetic resin layer is preferably provided on its upper surface with at least one linear or band reinforcing member. The linear or band reinforcing member has an appropriate strength and rigidity and shows effects of improving the handling property of the fastening member and reinforcing the foamed synthetic resin layer. The linear reinforcing member may be plastic wires or rods, or fiber strands. The band reinforcing member may be plastic films or narrow strips of fabric or non-woven fabric.

In the mold-in fastening member of the present invention, a foamed synthetic resin layer is disposed on the rear surface of the substrate, namely, the surface having no engaging elements. The substrate and the foamed synthetic resin layer are integrally bonded preferably by an adhesive. The foamed synthetic resin layer should be firmly bonded to the substrate, because the foamed synthetic resin layer is integrally bonded to the molded resin article by a partial impregnation of the molding resin into the foamed synthetic resin layer and the curing therein, and because the bared or exposed engaging elements of the substrate are engaged with loop elements of the upholstery material. For this purpose, a two-part adhesive or a moisture-setting hot melt adhesive is preferably used. To enhance the adhesion between the foamed synthetic resin layer and the substrate, the rear surface of the substrate may be roughened for attaining the anchoring effect.

The foamed synthetic resin, layer may be made of various synthetic resins, preferably polyurethane resin, because the molded resin articles are foamed cushions made of polyurethane.

The foamed synthetic resin layer, for example, a foamed polyurethane layer, may be produced by casting a mixed solution of isocyanate and polyol into a mold kept at 70° C., closing the mold, holding the solution in the mold for 10 min and then, opening the mold to remove the resultant foam.

From the inventors' view, the thickness of the foamed synthetic resin layer should be 1 to 10 mm. When the thickness is less than 1 mm, the sealing portion (indicated by numeral 5 in FIG. 1) at both the lateral overhanging marginal portions of the foamed synthetic resin layer has a smaller thickness to fail to avoid the gaps between the fastening member and the shoulder of the recess. When the thickness exceeds 10 mm, the foamed synthetic resin layer becomes bulky, thereby making the handling property and the workability poor, and a fitting operation into the recess difficult.

The fastening member of the present invention is placed in a mold, as shown in FIG. 1, such that the engaging elements 2 are inserted into the recess 4, and the sealing portions 5 at the overhanging marginal portions of the foamed synthetic resin layer are put on the shoulder 6 of the recess 4. When the molding resin is injected into the mold with the fastening member thus placed, the foamed synthetic resin layer 3 is compressed by gravity of the resin to closely press the sealing portions 5 against the shoulder 6 of the recess 4, thereby preventing gaps from being formed. As a result of the studies on this phenomenon, the inventors have found that the foamed synthetic resin layer is required to have an initial compressive modulus of 0.02 to 1.0 MPa. When the initial compressive modulus is less than 0.02 MPa, the foamed synthetic resin layer 3 is easily deformed even by the force other than the load of the resin, thereby failing to prevent gaps from being formed. When exceeding 1.0 MPa, the foamed synthetic resin layer 3 is difficult to deform, resulting in poor contact between the foamed synthetic resin layer 3 and the shoulder 6 of the recess 4 and a failure to prevent the formation of gaps.

The initial compressive modulus referred to herein is measured by the following method. A test specimen of a synthetic resin foam having a size of 40 mm×50 mm×50 mm is compressed at a rate of 30 mm/min to obtain a compression load-deflection curve. The initial compressive modulus is defined as a gradient of the curve at a deformation of 1 mm.

As described above, the mold-in fastening member of the present invention comprises a substrate having the engaging elements and a foamed synthetic resin layer bonded to the substrate. Since the substrate and the foamed synthetic resin layer are firmly bonded, the foamed synthetic resin layer itself is broken when subjected to measurement of adhesion strength of the fastening member. Such a breaking of the formed synthetic resin layer at any portion of the fastening member is undesirable for practical use, and therefore, the weakest foamed synthetic resin layer is preferred to have a hardness of 25 to 1,000 N. The foamed synthetic resin layer having such a hardness shows a sufficient strength and avoids breaking upon use. The hardness of the foamed synthetic resin layer is measured according to JIS K6401.

According to further studies made by the inventors, to reinforce the foamed synthetic resin layer and prevent its breaking, a thin and tough flat material, such as fabric, non-woven fabric, and film, may be adhered to the foamed synthetic resin layer on the surface to be bonded to the substrate. When the fastening member thus reinforced is placed in the mold, the reinforcing material is brought into contact with the shoulder of the recess. Therefore, a sufficiently flexible reinforcing material is preferred so as not to reduce the sealing effect of the foamed synthetic resin layer.

A non-woven fabric, especially a drylaid non-woven fabric, is preferably used as the reinforcing material because of its high reinforcing effect and effective prevention of gaps between the foamed synthetic resin layer and the shoulder of the recess. The thickness of the reinforcing material is preferably 0.1 to 5 mm. In case of the non-woven fabric, the fineness of fibers is preferably 1 to 10 dtex because a close contact with the shoulder of the recess is attained. When permeable to a liquid resin, such as a non-woven fabric and a fabric, the reinforcing material may be adhered to the surface of the foamed synthetic resin layer opposite to the surface in contact with the substrate. In this case, an adhesive is preferably applied on the surface interspersedly or linearly, rather than over the entire surface, so as not to inhibit the penetration of the liquid resin into the foamed synthetic resin layer. The foamed synthetic resin layer is also reinforced by using a molding resin containing short fibers or particles.

In addition, the foamed synthetic resin layer may be reinforced by providing through-holes extending from one surface to the other. When a molding resin enters into the through-holes and then cured therein, the foamed synthetic resin layer is reinforced by a plurality of cured resin columns. The size and density of the through-holes may be appropriately selected by taking into account the properties of the foamed synthetic resin layer. This embodiment is preferable because the cured resin also has an effect of bonding the substrate to the molded resin article.

The mold-in fastening member of the present invention is fitted to a linear or curved, recess formed in a mold for the production of the molded resin article. Then, a molding resin, usually an expandable liquid resin, is injected into the mold, and foamed and cured to obtain a molded article having a fastening member integrally bonded to its surface. Therefore, the fastening member is preferred to be fitted into the recess easily and surely.

In the fastening member of the present invention, the foamed synthetic resin layer has overhanging marginal portions with an appropriate length which extend outwardly beyond the edges of the substrate at least in the width direction, preferably in both the width and length directions. The overhanging marginal portions are put on the shoulder of the recess to accomplish the aimed sealing effect, and therefore, serve as the sealing portions. The length of the overhanging marginal portions are not particularly restricted, but may be appropriately determined according to the width of the shoulder of the recess. The width of the recess shoulder is usually about 2 to 5 mm, and the length of the overhanging marginal portions is determined so as to correspond thereto. When the length of the overhanging marginal portions is much smaller than the width of the shoulder of the recess, the sealing at the shoulder becomes incomplete. When the length of the overhanging marginal portions is much larger to extend beyond the shoulder of the recess, the sealing may be lost by an upward force exerted by the molding resin to the overhanging marginal portions (i.e., sealing portions). Therefore, the overhanging marginal portions of the mold-in fastening member preferably have a dimension nearly covering a entire surface of the shoulder, and more preferably have a width substantially the same as that of the shoulder. More specifically, the width of the overhanging marginal portions is preferably about the shoulder width ±2 mm, and more preferably about the shoulder width ±1 mm. The overhanging marginal portion having a width substantially the same as that of the shoulder means that the overhanging marginal portion covers a substantially entire surface of the shoulder and does not extend by 2 mm or more beyond the shoulder.

When the mold-in fastening member is of an elongated rectangular shape as shown in FIG. 1, only one recess corresponding thereto is used. In case of the curved mold-in fastening member as shown in FIG. 2 which has a series of unit fastening members 9, the series of unit fastening members 9 is simultaneously fitted into a single elongated curved recess or fitted into respective unit recesses arranged in curve corresponding to each unit fastening member 9. The use of the single elongated curved recess may fail to completely prevent the flow of a resin into the recess through gaps between the unit fastening members 9, although the fitting operation is easy. The fitting of the unit fastening members 9 into respective unit recesses is advantageous because a close contact of each unit fastening member 9 with each unit recess can be attained. However, the fitting operation takes much time and the position of each unit fastening member 9 should be accurately regulated, thereby increasing production costs. In the present invention, the recess configuration may be appropriately selected by taking the above advantages and disadvantages into consideration.

The mold-in fastening member is press-fitted into the recess and the sealing is effected by a frictional force between the foamed synthetic resin layer and the shoulder of the recess. In this embodiment, projections extending in the same direction as that of the engaging elements may be formed at the lateral and longitudinal end portions of the substrate to be bonded to the foamed synthetic resin layer. The projections acts as a fitting guide and ensures a stable fitting.

In order to further facilitate the fitting operation of the fastening member, a ferrite-containing layer 7 may be provided on the surface of the substrate and a magnet 8 on the bottom of the recess, as shown in FIG. 1. With this arrangement, the fitting and the sealing at the shoulder of the recess are more completely accomplished by the magnetic attraction force between the ferrite-containing layer and the magnet. By disposing the ferrite-containing layer on the surface of the substrate, the distance between the ferrite-containing layer and the magnet is reduced. As a result, the magnetic attraction force is enhanced to lead a more excellent sealing effect. The similar structure is applicable to the curved fastening member and curved recess. In the conventional techniques mentioned above, since the magnetic member is disposed between the flat fastener (substrate) and the soft foam, the distance between the magnetic member and the magnet is large so as to weaken the magnetic attraction force. On the contrary, a high sealing effect is attained in the present invention as described above.

The ferrite-containing layer 7 may be provided by any known method and preferably, for example, by applying an adhesive resin containing ferrite particles between rows of the engaging elements by a needle coater.

The mold-in fastening member of the present invention is used for the production of molded resin articles, such as automotive seats. Expandable polyurethane resins are preferably used as the molding resin, although not limited thereto and any other suitable resins may be used. After molding, an upholstery material, such as fabric or similar, is fixed to the surface of the molded resin article integrated with the fastening member by the engaging elements to form a covered product.

The present invention is described in more detail with reference to the following examples, but the examples are only illustrative and not intended to limit the scope of the invention thereto.

EXAMPLE 1

A polypropylene resin was molded into a fastening member comprising a substrate which was 8.5 mm wide, 0.5 mm thick, and 200 mm long, and included a number of engaging elements, each of which were 2.5 mm high and 0.2 mm wide in the longitudinal direction of the substrate and which were arranged on the surface of the substrate in three rows along its longitudinal direction and uprightly raised from the surface with a density of 60 elements/cm$^2$. The engaging elements were of mushroom shape, and the head portion thereof was spread in the width direction of the substrate.

A ferrite-containing acrylic resin layer, which was on average 0.5 mm thick and which contained 90% by weight of ferrite particles having an average particle size of 1.8 μm, was formed on the surface of the fastening member by a needle coating method in which the inner diameter of the needle was 1.0 mm.

As a foamed synthetic resin layer, a polyurethane foam was used which was 20 mm wide, 4 mm thick, and 220 mm long, which had an initial compressive modulus of 0.2 MPa and a hardness of 150 N, and which was bonded to the substrate provided with the ferrite-containing layer, through a moisture-setting hot melt adhesive ("HiBon #4830" available from Hitachi Kasei Polymer Co., Ltd.) so as to be equally aligned with each other in the width and length directions, thereby obtaining a mold-in fastening member according to the present invention.

The fastening member was fitted into an elongated rectangular recess in a mold having inside dimension with a width of 10 mm, a depth of 7 mm, and a length of 205 mm, so as to place the engaging elements within the recess and put the overhanging marginal portions of the foamed synthetic resin layer, which extended outwardly beyond the substrate, on the shoulder (width: 4 mm) of the recess, thereby sealing the engaging surface of the fastening member by the magnetic attraction force between the magnet embedded at the bottom of the recess and the ferrite-containing layer formed on the substrate. Then, a polyurethane resin was injected into the mold and foamed therein to obtain a molded resin article with the fastening member.

The engaging elements of the molded resin article were fully exposed on the outer surface thereof without being covered with the foamed resin. Also, it was confirmed that the foamed synthetic resin layer was partially embedded in the molded resin article such that the fastening member was firmly bonded to the molded resin article.

EXAMPLE 2

A mold-in fastening member and a molded resin article with the fastening member were produced in the same manner as in Example 1, except that a non-woven fabric of 20 mm wide, 220 mm long, and 2 mm thick made of fibers with a fineness of 4 dtex was interposed as a reinforcing material between the substrate and the foamed synthetic resin layer through an adhesive. The engaging elements of the fastening member were fully exposed on the outer surface of the molded resin article without being covered with the foamed resin. Also, it was confirmed that the foamed synthetic resin layer was partially embedded in the cushion such that the fastening member was firmly bonded to the molded resin article.

EXAMPLE 3

A fastening member produced by the same method as in Example 1 was cut into fifteen unit fastening members each having a length of 20 mm. The unit fastening members were adhesively bonded to a curved foamed synthetic resin layer having an initial compressive modulus of 0.2 MPa, a width of 20 mm, a thickness of 4 mm, a radius of curvature of 400 mm, and a length of 400 mm at intervals of 1 to 3 mm in the same manner as in Example 1 to obtain a curved mold-in fastening member.

Next, a mold having a curved recess (width: 9 mm; length: 390 mm; depth 3 mm; width of shoulder: 4 mm; radius of curvature: 400 mm), arranged so as to receive the respective unit fastening members in position, was prepared. A magnet was embedded at the bottom of the recess.

Following the same procedures of Example 1, the mold-in fastening member was fitted into the recess formed in the mold to produce a high-performance molded resin article with the fastening member.

EXAMPLE 4

A high-performance polyurethane molded article was produced in the same manner as in Example 1, except for adhesively bonding a reinforcing non-woven fabric as used in Example 2 to a foamed synthetic resin layer as used in Example 3.

COMPARATIVE EXAMPLE 1

The same procedures as in Example 1 were repeated, except for using a foamed polyurethane resin layer having a thickness of 0.5 mm, an initial compressive modulus of 0.2 MPa, and a hardness of 150 N. The engaging elements were partially covered with the foamed resin to show a reduced engaging force.

COMPARATIVE EXAMPLE 2

The same procedures as in Example 1 were repeated, except for using a foamed polyurethane resin layer having a thickness of 12 mm, an initial compressive modulus of 0.2 MPa, and a hardness of 150 N. The engaging elements were partially covered with the foamed resin because of the insufficient sealing of the fastening member in the curved recess.

COMPARATIVE EXAMPLE 3

The same procedures as in Example 1 were repeated, except for using a foamed polyurethane resin layer having a thickness of 4 mm, an initial compressive modulus of 0.01 MPa, and a hardness of 15 N. Although the foamed resin did not enter the engaging surface, the peel test showed that the adhesion between the fastening member and the foamed synthetic resin layer was as small as 500 g when measured at a pulling speed of 500 mm/min by a tensile tester.

COMPARATIVE EXAMPLE 4

The same procedures as in Example 1 were repeated, except for using a foamed polyurethane resin layer having a thickness of 4 mm, an initial compressive modulus of 1.5 MPa, and a hardness of 1000 N. The engaging elements were partially covered with the foamed resin because of the insufficient sealing of the fastening member in the curved recess. As described above, the mold-in fastening member of the present invention is easily and accurately fitted into the recess formed in the mold and ensures the sealing between the mold-in fastening member and the recess, thereby surely preventing the molding resin from entering into the engaging surface. The mold-in fastening member is firmly embedded in the molded resin article. Also, the mold-in fastening member may be of either linear or curved shape, thereby rendering it applicable to products with a wide range of designs.

Further, when the mold-in fastening member of the present invention is used to produce a seat cushion, a seat cover can be closely fitted to the cushion because the seat cover is pulled over and fixed to the cushion to provide a seat with comfortable feeling. In addition, the mold-in fastening member improves the productivity, safety, and workability.

What is claimed as new and desired to be secured by Letters Patent of the United States is:

1. A mold-in fastening member comprising:
   a substrate having engaging elements on a top surface thereof;
   a foamed synthetic resin layer bonded to a rear surface of the substrate, the foamed synthetic resin layer having lateral overhanging marginal portions extending outwardly beyond at least both lateral edges of the substrate, and having a thickness of 1 to 10 mm and an initial compressive modulus of 0.02 to 1.0 MPa; and
   a ferrite-containing layer positioned on said top surface of the substrate opposite said rear surface, substantially all of said ferrite containing layer being positioned between said engaging elements, the foamed synthetic resin layer having longitudinal overhanging marginal portions extending outwardly beyond both longitudinal edges of the mold-in fastening member, wherein the foamed synthetic resin layer comprises a polyurethane resin, and each of the lateral overhanging marginal portions and the longitudinal overhanging marginal portions has a width substantially the same as a width of each of corresponding lateral and longitudinal shoulders of a recess formed in a mold in which the substrate is placed, the mold having a magnet embedded therein to attract said ferrite-containing layer.

2. The mold-in fastening member according to claim 1, which is made into an elongated rectangular shape.

3. The mold-in fastening member according to claim 1, wherein the foamed synthetic resin layer is made of a polyurethane resin, and the lateral overhanging marginal portions of the foamed synthetic resin layer have a width substantially the same as a width of a corresponding lateral shoulder of a recess formed in a mold.

4. The mold-in fastening member according to claim 1, wherein the foamed synthetic resin layer is provided with a plurality of through-holes extending from a top surface to a rear surface.

5. A process for producing a molded resin article having a mold-in fastening member, the process comprising the steps of:
  placing a fastening member into a mold to form a mold-in fastening member, the mold-in fastening member including:
  a substrate having engaging elements on a top surface thereof; and
  a foamed synthetic resin layer bonded to a rear surface of the substrate, the foamed synthetic resin layer having lateral overhanging marginal portions extending outwardly beyond at least both lateral edges of the substrate, and having a thickness of 1 to 10 mm and an initial compressive modules of 0.02 to 1.0 MPa;
  fitting the engaging elements into a recess formed in the mold;
  putting at least the lateral overhanging marginal portions of the foamed synthetic resin layer on corresponding lateral shoulders of the recess;
  injecting a molding resin into the mold;
  curing the molding resin while pressing the lateral overhanging marginal portions under a load of the molding resin so as to prevent gaps from being formed between the molding fastening member and the recess; and
  placing a ferrite-containing layer on a front surface of the substrate opposite said rear surface, the foamed synthetic resin layer having longitudinal overhanging portions extending outwardly beyond both longitudinal edges of the mold-in fastening member, wherein the foamed synthetic layer comprises a polyurethane resin, and each of the lateral overhanging marginal portions and the longitudinal overhanging portions has a width substantially the same as a width of corresponding lateral and longitudinal shoulders of a recess formed in a mold in which the substrate is placed, the mold having a magnet embedded therein to attract said ferrite-containing layer.

6. A mold-in fastening member comprising:
  a substrate having engaging elements on a top surface thereof;
  a foamed synthetic resin layer bonded to a rear surface of the substrate, the foamed synthetic resin layer having lateral overhanging marginal portions extending outwardly beyond at least both lateral edges of the substrate, and having a thickness of 1 to 10 mm and an initial compressive modulus of 0.02 to 1.0 MPa; and
  a ferrite-containing layer positioned on said top surface of the substrate opposite said rear surface such that substantially all of said ferrite containing layer is positioned between said engaging elements.

7. A process for producing a molded resin article having a mold-in fastening member, the process comprising the steps of:
  placing a fastening member into a mold to form a mold-in fastening member, the mold-in fastening member including:
  a substrate having engaging elements on a top surface thereof; and
  a foamed synthetic resin layer bonded to a rear surface of the substrate, the foamed synthetic resin layer having lateral overhanging marginal portions extending outwardly beyond at least both lateral edges of the substrate, and having a thickness of 1 to 10 mm and an initial compressive modules of 0.02 to 1.0 MPa;
  fitting the engaging elements into a recess formed in the mold;
  putting at least the lateral overhanging marginal portions of the foamed synthetic resin layer on corresponding lateral shoulders of the recess;
  injecting a molding resin into the mold;
  curing the molding resin while pressing the lateral overhanging marginal portions under a load of the molding resin so as to prevent gaps from being formed between the molding fastening member and the recess; and
  placing a ferrite-containing layer on a front surface of the substrate opposite said rear surface such that substantially all of said ferrite containing layer is positioned between said engaging elements.

* * * * *